(12) United States Patent
Jayasena et al.

(10) Patent No.: US 10,042,762 B2
(45) Date of Patent: Aug. 7, 2018

(54) LIGHT-WEIGHT CACHE COHERENCE FOR DATA PROCESSORS WITH LIMITED DATA SHARING

(71) Applicant: Advanced Micro Devices, Inc., Sunnyvale, CA (US)

(72) Inventors: Nuwan Jayasena, Sunnyvale, CA (US); Michael Boyer, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 8 days.

(21) Appl. No.: 15/264,804

(22) Filed: Sep. 14, 2016

(65) Prior Publication Data

US 2018/0074958 A1 Mar. 15, 2018

(51) Int. Cl.
*G06F 12/08* (2016.01)
*G06F 12/0811* (2016.01)
*G06F 12/0815* (2016.01)

(52) U.S. Cl.
CPC ...... *G06F 12/0811* (2013.01); *G06F 12/0815* (2013.01); *G06F 2212/283* (2013.01); *G06F 2212/62* (2013.01); *G06F 2212/621* (2013.01)

(58) Field of Classification Search
CPC ............ G06F 12/0811; G06F 12/0815; G06F 12/0817; G06F 2212/27; G06F 2212/271; G06F 2212/283; G06F 2212/621; G06F 2212/622; G06F 12/0837
USPC ...................................................... 711/122
See application file for complete search history.

(56) References Cited

U.S. PATENT DOCUMENTS

| 5,778,429 A * | 7/1998 | Sukegawa ........... G06F 12/0813 711/118 |
| 6,615,322 B2 * | 9/2003 | Arimilli .............. G06F 12/0813 711/119 |
| 6,766,360 B1 * | 7/2004 | Conway .............. G06F 12/0817 709/212 |

(Continued)

OTHER PUBLICATIONS

D. Lenoski, J. Laudon, K. Gharachorloo, A. Gupta, and J. Hennessy. 1990. The directory-based cache coherence protocol for the DASH multiprocessor. SIGARCH Comput. Archit. News 18, 2SI (May 1990), 148-159. DOI: https://doi.org/10.1145/325096.325132 (Year: 1990).*

(Continued)

*Primary Examiner* — Reginald G Bragdon
*Assistant Examiner* — Aaron D Ho
(74) *Attorney, Agent, or Firm* — Polansky & Associates, P.L.L.C.; Paul J. Polansky

(57) ABSTRACT

A data processing system includes a plurality of processors, local memories associated with a corresponding processor, and at least one inter-processor link. In response to a first processor performing a load or store operation on an address of a corresponding local memory that is not currently in the local cache, a local cache allocates a first cache line and encodes a local state with the first cache line. In response to a load operation from an address of a remote memory that is not currently in the local cache, the local cache allocates a second cache line and encodes a remote state with the second cache line. The first processor performs subsequent loads and stores on the first cache line in the local cache in response to the local state, and subsequent loads from the second cache line in the local cache in response to the remote state.

29 Claims, 5 Drawing Sheets

(56) References Cited

U.S. PATENT DOCUMENTS

| | | | |
|---|---|---|---|
| 7,155,572 | B2 | 12/2006 | Hughes et al. |
| 2003/0028819 | A1* | 2/2003 | Chiu ................. G06F 11/2089 714/5.11 |
| 2004/0064651 | A1 | 4/2004 | Conway |
| 2004/0230750 | A1 | 11/2004 | Blake et al. |
| 2004/0236912 | A1 | 11/2004 | Glasco |
| 2008/0215819 | A1 | 9/2008 | Cantin et al. |
| 2009/0089511 | A1 | 4/2009 | O'Krafka et al. |
| 2015/0113221 | A1* | 4/2015 | Hum ................. G06F 12/0871 711/125 |
| 2015/0186215 | A1 | 7/2015 | Das Sharma et al. |

OTHER PUBLICATIONS

L. Ceze et al., "Lecture 18", Winter 2009, hosted by University of Washington, Computer Science and Engineering Department (Year: 2009).*

J. Handy, "Micron Announces Processor-In-Memory", published Nov. 18, 2013, hosted by The Memory Guy, <http://thememoryguy.com/micron-announces-processor-in-memory/> (Year: 2013).*

Y. Kurita et al., "Vertical Integration of Stacked DRAM and High-Speed Logic Device Using SMAFTI Technology," in IEEE Transactions on Advanced Packaging, vol. 32, No. 3, pp. 657-665, Aug. 2009.doi: 10.1109/TADVP.2009.2015461 (Year: 2009).*

Z.K. Baker, "One-Hot Encoded Finite State Machines", hosted by the University of New Mexico, retrieved via the WayBack Machine , <https://web.archive.org/web/20120410234710/http://www.unm.edu/~zbaker/ece238/> (Year: 2012).*

Hechtman, Blake A., et al. "QuickRelease: A throughput-oriented approach to release consistency on GPUs." 2014 IEEE 20th International Symposium on High Performance Computer Architecture (HPCA). IEEE, 2014.

Hower, D., "Acoherent Shared Memory", Ph.D., Dissertation, University of Wisconsin-Madison, 2012.

Lebeck, A.R. et al., "Dynamic Self-Invalidation: Reducing Coherence Overhead in Shared-Memory Multiprocessors" Proceedings of the 22nd annual international symposium on Computer architecture, p. 48-59, Jun. 22-24, 1995, S. Margherita Ligure, Italy [doi>10.1145/223982.223995].

Nair, R. et al., "Active memory cube: a processing-in-memory architecture for exascale systems", IBM Journal of Research and Development, vol. 59, No. 2/3, 2015.

Singh, I. et al., "Cache Coherence for GPU Architectures", HPCA '13 Proceedings of the 2013 IEEE 19th International Symposium on High Performance Computer Architecture (HPCA), pp. 578-590.

International Search Report and Written Opinion for International Application No. PCT/US2017/44221, dated Nov. 8, 2017, 11 pages.

* cited by examiner

| | LOCAL MEMORY | REMOTE MEMORY |
|---|---|---|
| LOAD | CACHEABLE<br>R=0<br>V=1 | CACHEABLE<br>R=1<br>V=0 |
| STORE | CACHEABLE<br>R=0<br>V=1<br>VISIBLE TO EXTERNAL DEVICES | NON-CACHEABLE<br>(WRITE-THROUGH)<br>TO REMOTE |

LIGHT-WEIGHT CACHE COHERENCE FOR DATA PROCESSORS WITH LIMITED DATA SHARING

STATEMENT REGARDING GOVERNMENT SPONSORED RESEARCH

This invention was made with Government support under Prime Contract Number DE-AC52-07NA27344, Subcontract No. B609201 awarded by the Department of Energy (DOE). The Government has certain rights in this invention.

BACKGROUND

Many types of modern computing systems incorporate multiple processors and accelerators operating within a single address space. An important subclass of such systems are those with many loosely-coupled (i.e., not on the same die/chip) processors or accelerators, each with some amount of directly-attached memory, which also have the ability to access memory elsewhere in the system albeit at increased cost. Examples include systems with multiple discrete graphics processing units (GPUs) and the emerging class of in-memory or near-memory processing devices. Due to the highly efficient access to the directly attached "local" memories, application programs written for these systems will mostly operate out of that local memory with only infrequent accesses to other memories in the system.

Most traditional cache coherence mechanisms rely on either a broadcast mechanism that makes any memory access by any processor visible to all other coherent processors, or a directory structure that uses a system of probes and responses with local probe filters that store information about which processors are caching what cache lines. However the broadcast approach does not scale to large numbers of coherent processors or to bandwidth-intensive devices such as GPUs and processors-in-memory (PIMs) due to high bandwidth needed. The directory approach is more scalable but incurs high storage overheads and design complexity to track what processor is caching what data and how to keep them coherent. Furthermore, the directory based coherence protocols require knowledge of the number of coherent processors in the system at design time, or incur further overhead.

A simple approach to cache coherence is to make shared data uncacheable. However, this often leads to significant performance degradations due to inefficient use of memory bandwidth and long load latencies as a result of not being able to exploit temporal and spatial locality. Some early implementations of cache coherent GPUs and other accelerators exploited relaxed memory models to provide low-cost coherence via cache flushes. In these systems, caches are flushed at synchronization points to flush out cached writes so that they are visible to other entities in the system, and to purge local copies so that subsequent reads will pull in updates from other devices in the system. However, cache flushing is expensive for fine-grain data sharing or synchronization because it evicts the entire contents of the cache. Thus, existing scalable solutions to cache coherence either incur high storage and communication costs or result in degraded performance.

Figure 1:
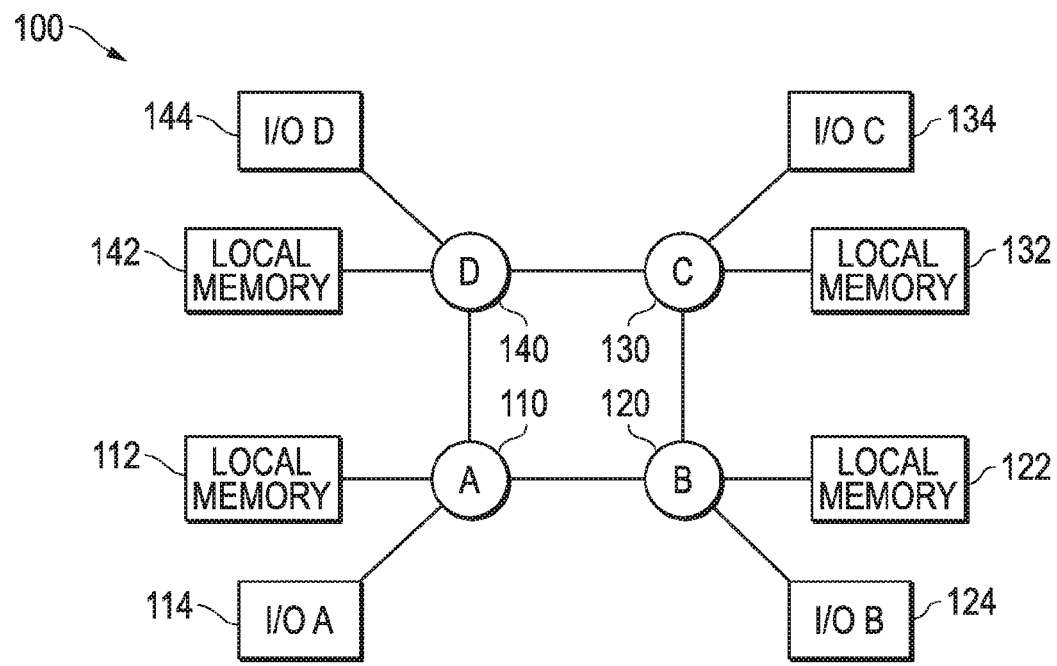
FIG. 1 illustrates in block diagram form a non-uniform memory access (NUMA) data processing system according to the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In one form, a data processing system includes a plurality of processors, each including a local cache, a plurality of local memories each associated with and coupled to a corresponding one of the plurality of processors, and at least one inter-processor link between a corresponding pair of the plurality of processors. In response to a first processor performing a load or store operation on an address of a corresponding local memory that is currently not in the local cache, the local cache allocates a first cache line and encodes a local state with the first cache line. In response to the first processor performing a load operation from an address of a remote memory that is not currently in the local cache, the local cache allocates a second cache line and encodes a remote state with the second cache line. The first processor performs subsequent loads and stores on the first cache line in the local cache in response to the local state, and performs subsequent loads from the second cache line in the local cache in response to the remote state. In some embodiments, if the first processor performs a store operation to an address of the remote memory that is currently not in the local cache, the local cache performs a write-through of data of the store operation to the remote memory without allocating a cache line in the local cache. Moreover if one of the processors performs a store access to the second cache line, the local cache updates its copy of the second cache line and also performs a write-through operation of the store access to the remote memory.

In another form, a memory module includes a local processor having a local cache and an inter-processor link, and a local memory having a plurality of memory chips attached to the local processor. In response to the local processor performing a load or store operation on an address of the local memory that is not currently in the cache, the local cache allocates a first cache line and encodes a local state with the first cache line. In response to the local processor performing a load operation from an address of a remote memory that is currently not in the cache, the local cache allocates a second cache line and encodes a remote state with the second cache line. The local processor performs subsequent loads and stores to the first cache line in the local cache in response to the local state, and performs subsequent loads from the second cache line in the local cache in response to the remote state.

In yet another form, a method includes generating a memory operation by a processor associated with a local memory. In response to a load or store operation to the local memory, a cache line is allocated to a local cache and the cache line is placed in a valid state while keeping a remote state clear. In response to a load operation to a remote memory, a cache line is allocated to the local cache and the cache line is placed in the remote state while keeping the valid state clear. A subsequent access is performed to the cache line in the local cache in response to one of the valid state and the remote state being set.

FIG. 1 illustrates in block diagram form a non-uniform memory access (NUMA) data processing system 100 according to the prior art. NUMA data processing system 100 includes processor nodes 110, 120, 130, and 140 labeled "A", "B", "C", and "D", respectively. As shown in FIG. 1 processor nodes 110, 120, 130, and 140 have corresponding input/output (I/O) controllers 114, 124, 134, and 144 labeled "I/O A", "I/O B", "I/O C", and "I/O D", respectively, connected to a respective one of processor nodes 110, 120, 130, and 140. Further, associated with each of processor nodes 110, 120, 130, and 140 are local memories 112, 122, 132, and 142, respectively. Thus processor node 110 can access either its local memory 112 or a remote memory, such as memory 132, which is local to processor node 130 but is remote from processor node 110. NUMA data processing system 100 allows both high throughput using multiprocessing and system scalability, because either additional resources can be added to existing processing nodes, or more processing nodes can be added to the system.

However existing NUMA architectures have some drawbacks. For example, all local memories 112, 122, 132, and 142 together form a shared memory fabric that any processor node can access. In the example shown in FIG. 1, each processing node includes at least one processor that has a cache hierarchy. In order for the memory system to remain coherent, the processor nodes generate an extensive series of probes and probe responses that are exchanged between processor nodes so that each processor node has access to an up-to-date copy of the data in the memory system. The efficiency of NUMA data processing system 100 decreases due to the need to keep the memory coherent. Such a system is desirable for high end data processing systems such as servers, but less so for other data processing systems. One such data processing system uses the processor-in-memory architecture in which processors are closely associated with their own local memories and are unlikely to access significant amounts of remote data.

Figure 2:
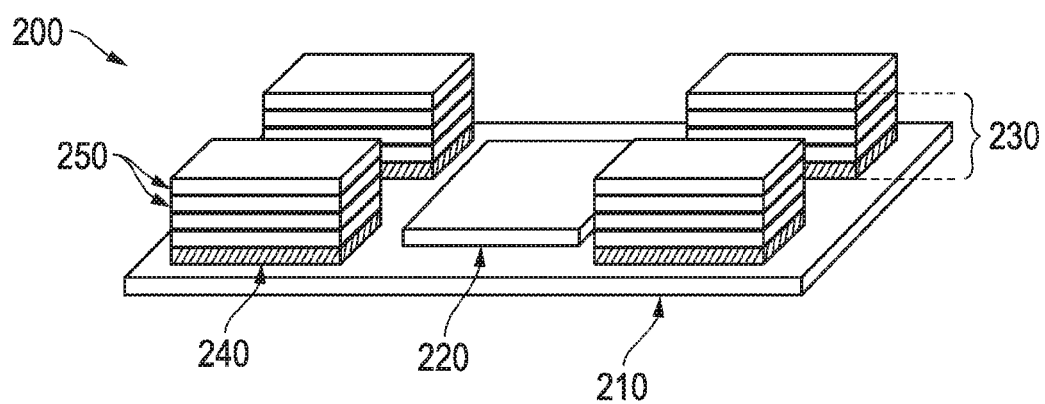
FIG. 2 illustrates a perspective view of a data processing system having a set of memory modules each with a processor-in-memory (PIM) according to some embodiments.

FIG. 2 illustrates a perspective view of a data processing system 200 having a set of memory modules each with a processor-in-memory (PIM) according to some embodiments. In the example shown in FIG. 2, processing system 200 includes a host processor 220 and a set of four memory modules 230 each including a processor 240 operating as a processor-in-memory (PIM) with a set of four vertically stacked memory die 250, all mounted on a printed circuit board or interconnect substrate 210. In one exemplary embodiment, memory modules 230 use high bandwidth memory (HBM) that is well adapted for vertical stacking through its use of through-silicon-via (TSV) technology, allowing data processing system 200 to occupy a relatively small amount of planar area and a relatively small amount of volume. In other embodiments, the PIM could be integrated with the memory on the same chip, while still having a cache that needs to be kept coherent with at least a portion of the other processors in the system.

In one exemplary embodiment, data processing system 200 includes general-purpose graphics processing units as PIMs 240 and host processor 220 handles I/O communication as well as task orchestration among the PIMs. Each PIM uses its local memory primarily for its own specific tasks. It should be apparent that the graphics processing unit example is only one example and that many others are possible.

In the embodiment shown in FIG. 2, each processor has a four-die memory stack associated with it. The memory which is closely associated with a processor is deemed to be "local memory" to the processor. All other memory present in data processing system 200 which the processor can access but that is not local memory is known as "remote memory". All the memory shown in FIG. 2 is associated with a processor. However in other embodiments, the data processing system may have memory directly attached to host processor 220 without an intervening processor, in which case this memory would be considered to be remote memory to every PIM in the system.

Data processing system 200 includes a set of processors that have limited data sharing with each other in which each processor uses one or more caches implementing a light-weight cache coherence scheme. By including the light-weight cache coherence scheme, the data is kept coherent but without the high overhead required by a probe-response or broadcast coherence mechanism.

Figure 3:
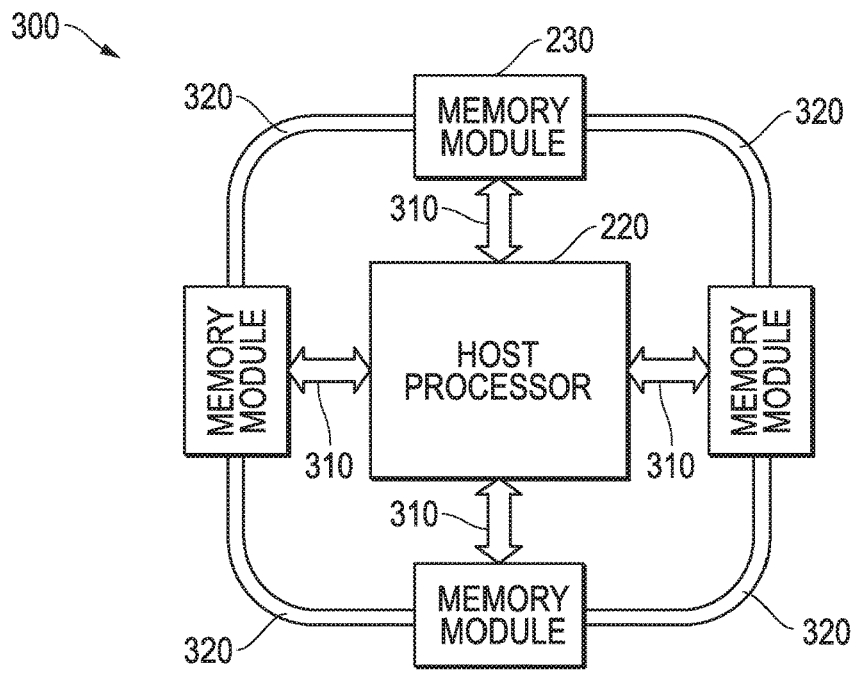
FIG. 3 illustrates in block diagram form a data processing system that can be used as the data processing system of FIG. 2.

FIG. 3 illustrates in block diagram form a data processing system 300 that can be used as data processing system 200 of FIG. 2. Data processing system 300 has a host processor 220 that is connected to each memory module 230 by a dedicated point-to-point link 310, and the PIM of each memory module 230 is connected to the PIM of two adjacent memory modules using bidirectional, point-to-point inter-processor links 320. Note that while FIG. 3 shows an electrical diagram, memory modules 230 can either be connected to two adjacent processors using point-to-point links 310, or to other neighboring processors. It should be apparent that additional inter-processor links could be used to directly link more than two processors, and the number of such links is limited only by the number of layers of, and spacing of memory modules 230 on, interconnect substrate 210. However even from this diagram, it should be apparent that performance will be improved if each PIM operates primarily on data in its own associated memory by reducing the cross sharing of data with other memory modules. Data processing system 300 uses a light-weight coherence protocol suitable for further reducing the inter-processor traffic required to maintain coherence.

In the embodiment shown in FIG. 3, the PIMs are directly connected to each other. In another embodiment, the PIMs can be physically interconnected only with host processor 220, and communicate with each other indirectly through host processor 220.

Figure 4:
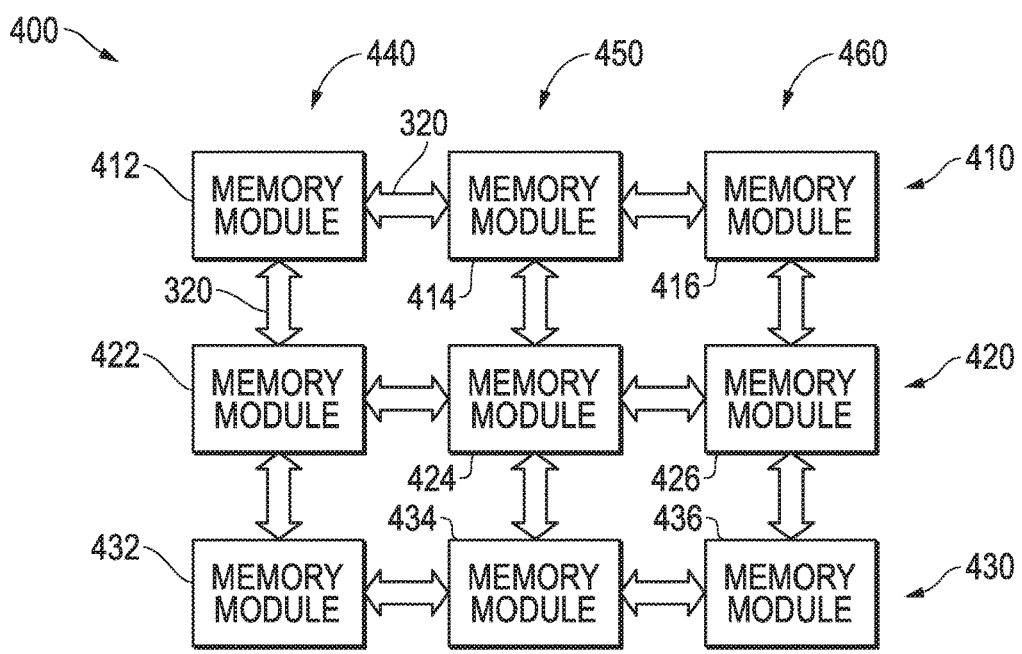
FIG. 4 illustrates in block diagram form a data processing system having an array of memory modules each with a PIM according to some embodiments.

FIG. 4 illustrates in block diagram form another data processing system 400 having an array of memory modules each with a PIM according to some embodiments. Data processing system 400 does not have a host processor and includes a set of nine memory modules each with a PIM arranged into a set of three rows 410, 420, and 430 and three columns 440, 450, and 460 with a memory module at the intersection of each row and column. Thus row 410 includes memory modules 412, 414, and 416, row 420 includes memory modules 422, 424, and 426, and row 430 includes memory modules 432, 434, and 436. Column 440 includes memory modules 412, 422, and 432, column 450 includes memory modules 414, 424, and 434, and column 460 includes memory modules 416, 426, and 436. Each memory module is connected by a bidirectional link to adjacent memory modules. Thus memory module 412 is connected to memory modules 414 and 422, memory module 422 is connected to memory modules 412, 424, and 432, and so on.

As in data processing systems 200 and 300, each PIM in data processing system 400 has high bandwidth and low-energy access to its local memory. At the same time it is desirable to allow any PIM to access any memory in the system, to ease programmability in non performance-critical code regions and to enable incremental code porting to the PIM. The programmer or compiler can optimize code for PIM systems to perform most of the accesses to a processor's own local memory, but allow for a small number of accesses to remote memory.

Note two things about data processing system 400. First, data processing system 400 does not include any host processor, but only contains an array of interconnected memory modules, each with its own PIM. Second, data processing system 400 illustrates that as system topologies scale to large numbers of memory modules, the overhead for a probe-response coherence mechanism increases by a greater degree. For example if a PIM in memory module 412 attempts to access memory in memory module 436, the probe and response would each require four "hops" between the requestor and the owner, as well as additional probes and responses to and from any other memory modules that have cached copies of the memory location in question.

Figures 5, 6:
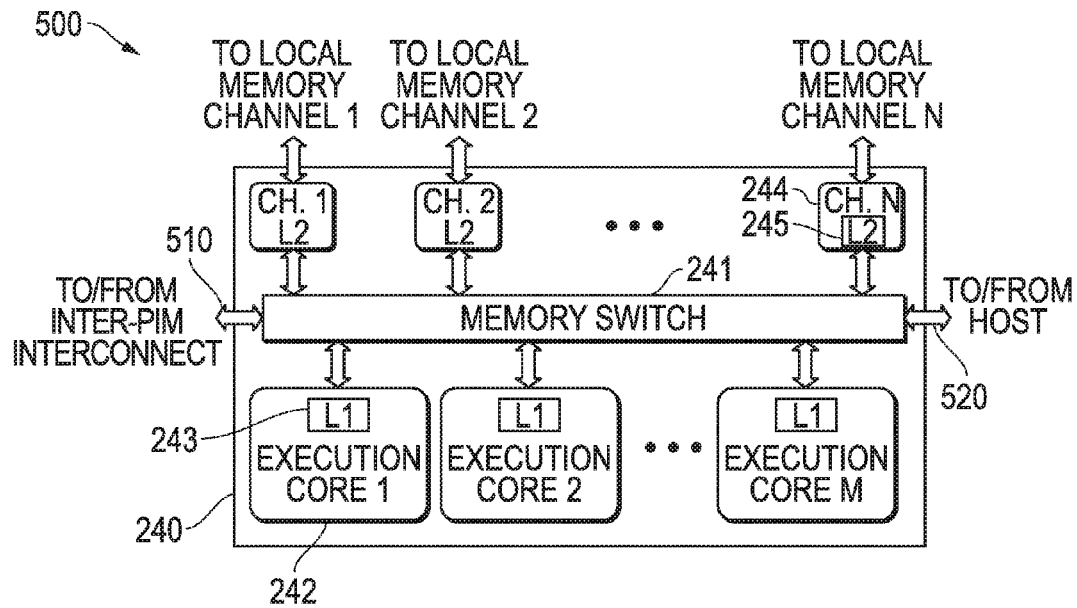
FIG. 5 illustrates in block diagram form a single PIM device of the data processing system of FIG. 2 showing additional details of the data processor according to some embodiments.
FIG. 6 illustrates a table showing the operation of the cache controller of the processor-in-memory of FIGS. 2-5.

FIG. 5 illustrates in block diagram form a single PIM 500 of data processing system 200 of FIG. 2 showing additional details of data processor 240 according to some embodiments. Data processor 240 includes generally a set of one or more execution cores, such as central processing unit (CPU) cores or graphics processing unit (GPU) cores, including an exemplary execution core 242 having an upper layer (L1) cache 243. Execution core 242 is connected to other processors-in-memory, memory channels, and a host processor over a memory switch 241. Memory switch 241 is an internal crosspoint switch that allows the interconnection of any of the processors with any addressable resource. These resources include a set of memory channel controllers such as an exemplary memory channel controller 244 having a lower-level (L2) cache 245. PIM 500 also includes an inter-processor link 510 and a host link 520. In this example the L2 caches are broken down by physical memory space to cache that portion of the physical memory space corresponding to the physical memory on the channel. The memory hierarchy thus includes an upper layer cache such as L1 cache 243, a lower-level cache such as L2 cache 245, and the physical memory addressed by the memory channel controller.

To enhance programmability of the system, it is highly desirable to maintain cache coherence among PIM devices (or accelerators) in a system. However, as high-performance systems may contain large numbers of memory modules to provide the necessary memory capacity, and correspondingly large numbers of PIM devices, traditional coherence schemes are expensive to deploy. This expense is manifested both in the form of directory storage to track which devices are caching what data, as well as in terms of coherence messages.

Data processing system 200, however, avoids the need for explicit tracking of data sharing among PIMs and the need for coherence messages to be exchanged among PIM devices. It provides several desirable benefits. First, it reduces storage and communication cost due to eliminating directory storage and coherence messages. Second, it scales to arbitrary numbers of PIM devices. Third, the design of individual memory and PIM modules is independent of the number of PIM devices that may be incorporated in a system and be kept coherent, i.e., there is no requirement to know how many data sharers there may be in a system. Fourth, it provides efficient performance for software in which PIMs share limited amounts of data and thus perform limited amounts of remote memory accesses, while guaranteeing correctness (albeit at degraded performance) for software in which PIMs share large amounts of data. Fifth, it integrates with other coherence schemes for maintaining coherence among the cores that may be implemented by each individual component (PIM or host processor).

Data processing system 200 exploits the observation that caches only need to provide a coherent view to communicating devices at synchronization points under weak consistency models (e.g., "acquire" and "release" operations that are initiated by software using a release consistency model).

Data processing system 200 has the following behaviors for different types of memory accesses. For local memory accesses (i.e., loads and stores by a processor to its local memory), the processor (e.g., a PIM) is allowed to cache any data that it reads from or writes to its local memory. The processor makes write data visible on any external accesses. For example, if a processor writes to an address in its local memory and performs a release operation, the value of the most recent write must be visible to a subsequent access to the same address by another processor. The processor's cache can ensure this capability by a variety of methods, including enforcing a write-through policy for writes to the local memory, by flushing all accumulated local writes to DRAM on a release operation, by checking all of the processor's caches in response to the external read, or by some combination of these. In the illustrated embodiment, data processor 240 satisfies the visibility requirement by enforcing a write-through policy for all L1 caches, ensuring that all local writes are promptly reflected in the L2 caches. Because the L2 caches are checked on external accesses as well, any local writes will be visible to external accesses. This requirement is fulfilled within each execution core, which requires access to only its local data, and does not introduce additional external probe and response traffic or scalability limits.

For remote loads (i.e., reads initiated by a remote processor), the remote processor is allowed to cache data that has been read from remote memory. This capability accommodates the characteristic that read-only data are frequently shared among many devices (e.g., look-up tables). However, all such remote data in the processor's caches are placed in the remote state, for example by the encoding that will be described further below.

For remote stores (i.e., writes from a remote processor), the remote processor does not cache the data in its local cache in one embodiment, and observes a write-through policy by writing the data to remote memory. Whether a data item being written is local or remote can easily be determined in physically-tagged caches (which is the predominant form of caching in today's systems). In these systems, the memory address being accessed indicates its location because the physical address space is statically distributed among the memory modules. Remote processors may use write-coalescing buffers (i.e., buffers that combine multiple writes to the same cache line by the same processor) to improve communication efficiency among memory modules so that multiple writes to the same cache line can be combined before sending the cache line to the local processor over the interconnect.

To support the acquire and release operations used in weak consistency models, each local processor supports the following actions. In response to an acquire operation, all remote data (i.e., data in cache lines in the remote state) in caches of the PIM core executing the acquire operation are invalidated. In the exemplary processor 240 of FIG. 5, the acquire operation invalidates all remote data in the L1 cache of the execution core executing the acquire operation. In this example, the L2 caches only cache local data. The acquire operation does not complete until the L1 cache performs this invalidation. This behavior guarantees that any subsequent reads to remote memory from the processor executing the acquire operation will fetch updated data from the remote memory module. The entire L1 cache need not be flushed, because the cache keeps track of the cache lines that are in the remote state. The acquire operation is performed within the local processor executing the acquire operation and does not limit scalability.

In response to a release operation, any write-coalescing buffers storing remote data in any path from the local processor executing the release operation to any remote memory in the coherent system is flushed. This operation typically only involves buffers within the local processor executing the release operation, and therefore does not limit scalability. This behavior guarantees that any writes performed before the release operation by the processor to remote memory are made visible to any other device within the coherent system. The release operation does not complete until the writes have been flushed to a point where they cannot be re-ordered with subsequent writes from the local processor executing the release.

Flushing remote cache lines on an acquire operation may be achieved by walking through the cache one line at a time to identify and invalidate any remote data. This cache walking procedure may be done in software or via a dedicated hardware unit at each cache, and is a feasible and simple implementation for small caches. However this technique can be expensive for large caches. In these situations, the cache can have an optimized hardware implementation such as by using the one described below.

In other forms of weak consistency models, some combination of the actions of acquire and release operation described above can be performed based on the semantics of the synchronization primitives of the model.

FIG. 6 illustrates a table 600 summarizing the operation of the cache controller of the data processors of FIGS. 2-5. There are two types of memory access operations, loads (i.e., reads) and stores (i.e., writes), and two classes of locations of the data, local memory and remote memory. The memory access behavior of the accessing processor varies based on these characteristics as follows. A load to local memory is cacheable. If the line is not already in the cache, then it is allocated to the cache in the local state (R=0, V=1), and the data is returned to the local processor. A store to local memory is also cacheable. If the line is not already in the cache, then it is allocated to the cache in the local state (R=0, V=1) and the updated data is stored in the local cache with the "dirty" (D) bit set to indicate it has been modified. On an access of the cache line by a remote processor, the updated data is made visible to external devices, such as remote processors. A load from remote memory is cacheable. If the line is not already in the cache, then it is allocated to the cache in the remote state (R=1, V=0), and the data is returned to the local processor. A store to remote memory is non-cacheable. The local cache does not allocate a cache line, and the data is written through to the remote processor.

Hardware Support for Cached Remote Data Invalidation

A simplistic implementation of invalidating remote data in a cache in response to an acquire operation would include walking through each line in the cache to be invalidated and invalidating any cache line marked as remote. However this operation would take a significant amount of time for large caches.

Figure 7:
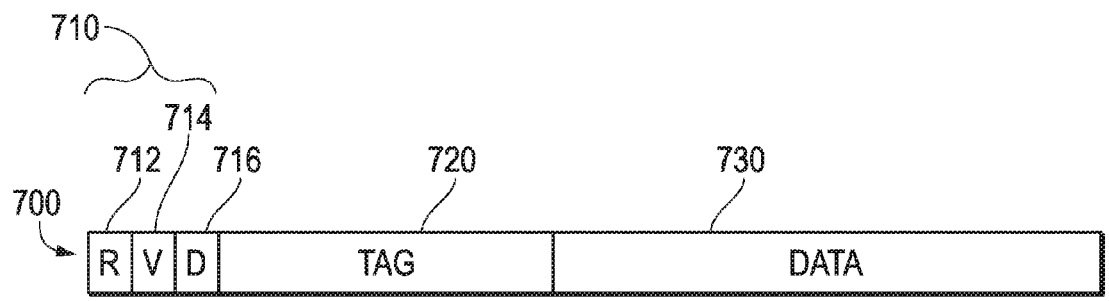
FIG. 7 illustrates a cache line that may be used by one of the caches of FIG. 5.

FIG. 7 illustrates a cache line 700 that may be used by one of the caches of FIG. 5. Cache line 700 includes a control field 710, a tag field 720, and a data field 730. Control field 710 includes a remote bit 712 labeled "R", a valid bit 714 labeled "V", and a dirty bit 716 labeled "D". Note that control field 710 includes additional metadata not relevant to understanding the exemplary embodiments that is not shown in FIG. 7. Tag field 720 includes address information that uniquely identifies the original memory location of the data in the cache line 700. Data field 730 includes the data for the corresponding cache line. The cache line is valid in the local state if the V bit is set to 1 and the R bit is cleared to 0. The cache line is valid in the remote state if the R bit is set to 1 while the V bit remains cleared. The cache line is in the invalid state otherwise.

The encoding of the states as in cache line 700 allows a more efficient implementation of the invalidation operation for remote data. When a cache line corresponding to a local memory address is allocated, the V bit is set (as is the case with typical caches) and the R bit is cleared. When a cache line corresponding to a remote memory access is allocated, the V bit is not set, but the R bit is set. A cache line is considered "valid" if either the V bit or the R bit is set. In such a cache, invalidating all remote data (and only the remote data) can be achieved by simply clearing all R bits of all cache lines. This invalidation operation leaves local data unaffected and invalidates only the remote data. Quickly "gang-clearing" the R bit of every cache line can be implemented efficiently using well-known techniques, for example by storing the R bit for all cache lines in a separate hardware structure where all bits can be reset in parallel.

Optimization for Frequent Remote Writes

The above baseline technique uses write-through for remote data (i.e., writes to remote memory are not cached by the local processor). This baseline technique is acceptable for extremely limited numbers of remote writes, but is inefficient in systems with significant numbers of remote writes. The baseline technique can be modified to allow write caching by the addition of an auxiliary hardware data structure (e.g., a first-in, first-out (FIFO) buffer) that tracks all writes to remote locations. This auxiliary hardware structure does not store the write data, which is stored in the cache itself. It simply tracks which remote locations have been written and where the corresponding data is in the local cache. Each entry in this hardware data structure tracks a single remote cache line that has been written. It also contains a bitmask that indicates which bytes of the cache line have been written. The bitmask is used to merge writes to the same remote cache line from multiple devices. Any bytes that have been written by multiple devices correspond to race conditions and no ordering needs to be enforced.

Figure 9:
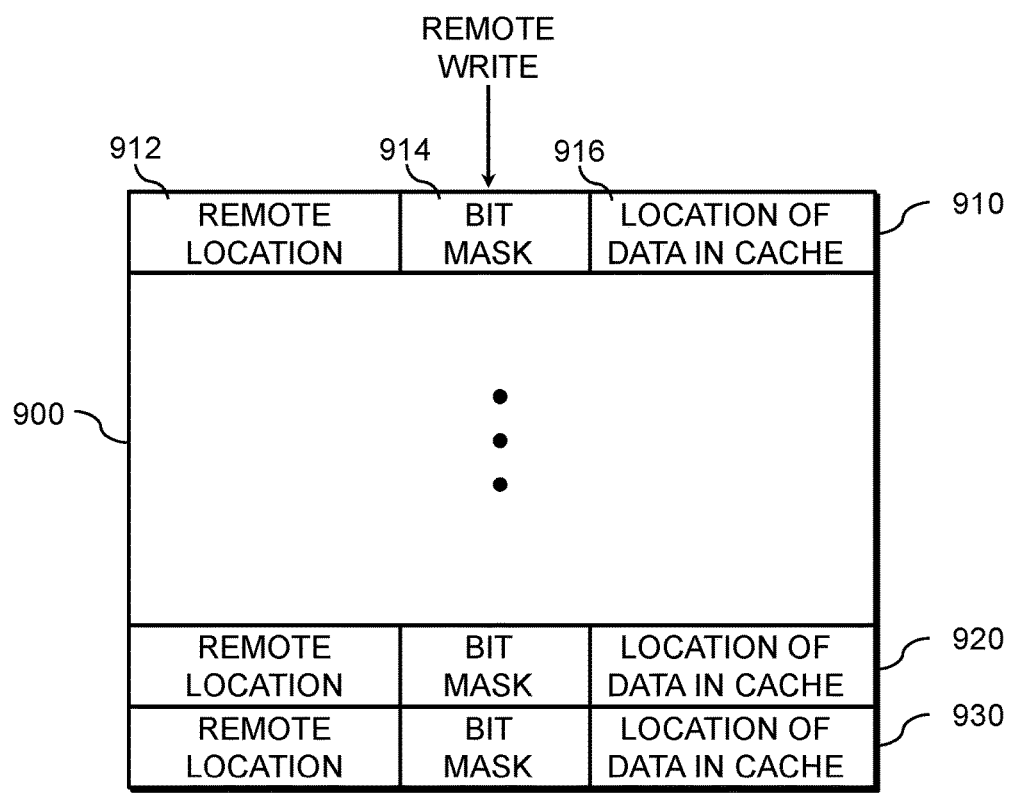
FIG. 9 illustrates in block diagram form a FIFO buffer according to some embodiments.

FIG. 9 illustrates in block diagram form a FIFO buffer 900 according to some embodiments. FIFO buffer 900 includes a set of locations including representative FIFO locations 910, 920, and 930 arranged as a FIFO. FIFO location 910 is located at the top of FIFO buffer 900 and receives and stores information about a remote write. This information includes a field 912 for storing the remote location, a field 914 containing a bit mask that indicates which bytes of the cache line have been written, and a field 916 that indicates where the corresponding data is in the local cache.

During acquire and release operations, all writes tracked in this auxiliary structure are flushed out to the appropriate remote memories. Flushing is required for acquire operations to avoid errors due to multiple processors writing disjoint subsets of the same cache line. The local cache only updates memory with those bytes from the cache line that have been written as indicated by the bitmask. Because the coherence scheme does not prevent multiple devices writing to the same cache line concurrently, the byte-level tracking of writes correctly handles the case where multiple devices write to non-overlapping bytes of the same cache line concurrently.

Coherence Among Subsets of Modules

The above-described baseline technique supports differentiation between local and remote data in caches, and provides a simple implementation for infrequent data sharers that does not require code modifications to maintain coherence. However, with appropriate system and application software support, this same set of hardware mechanisms can be used to further reduce coherence overheads.

Figure 8:
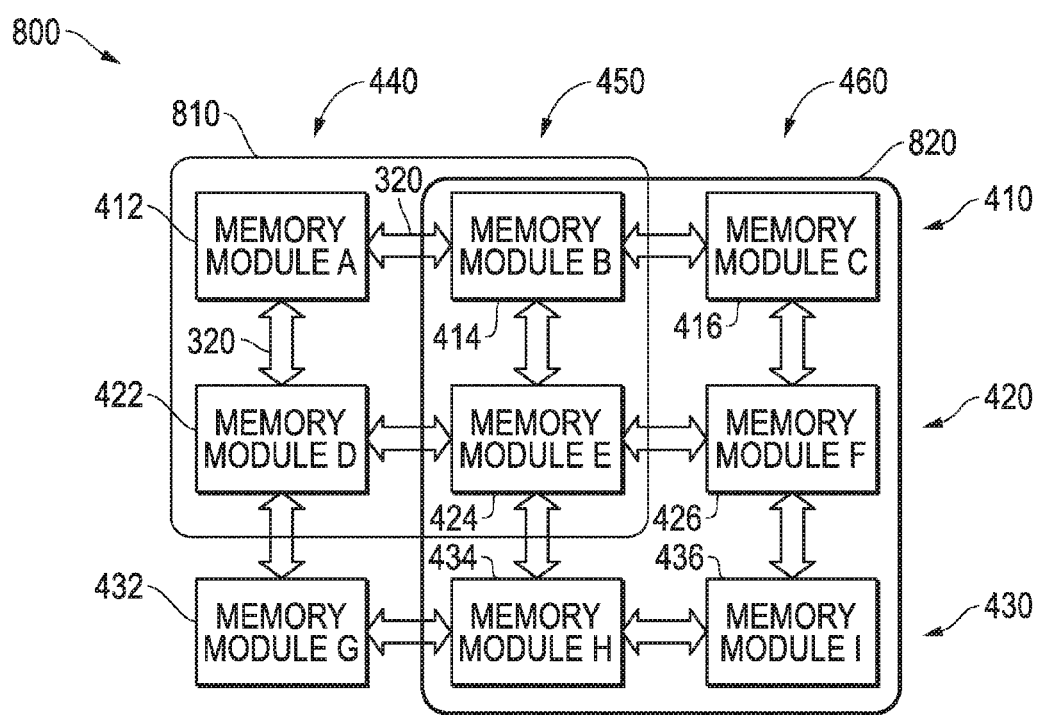
FIG. 8 illustrates in block diagram form a data processing system with coherence subsets according to some embodiments.

FIG. 8 illustrates in block diagram form a data processing system 800 with coherence subsets according to some embodiments. Data processing system 800 is similar to data processing system 400 of FIG. 4, except that memory modules 412, 414, 422, and 424 (A, B, D, and E) together form a coherence subset 810, and memory modules 414, 416, 424, 426, 434, and 436 (B, C, E, F, H, and I) together form a coherence subset 820.

Note that some PIM devices (B and E) belong to more than one coherence subset and another (G) belongs to no coherence subsets. In data processing system 800, each processor only sets the R bit in its local caches when storing remote data from the modules it needs to be coherent with, i.e., those that are in its coherence subset. The V bit is set for all other valid caches lines, including those corresponding to remote cache lines from modules that are not in a coherence subset with the processor in question. This modification allows data read from other modules in the system to persist in caches across acquire operations.

For example, processor A only sets the R bit when storing data that is local to B, D and E; processor C only sets the R bit when caching data that is local to modules B, E, F, H, and I; processor B sets the R bit when caching data that is local to modules A, C, D, E, F, H, and I; and processor G does not set the R bit for any cache lines because it does not need to be coherent with any other device.

Determining which subsets of devices should be coherent is defined by system software, application software, or another authority. Configuring the hardware of each processor to "know" which nodes it is coherent with is done by system software by setting appropriate control registers and/or other hardware configuration state. This configuration may be accomplished by programming address ranges that indicate to the hardware which cache lines are to be marked by setting the R bit (i.e., those corresponding to modules the device in question is coherent with), programming specific device IDs to be coherent with, or other similar methods.

If this technique is combined with the optimization to allow caching frequent remote writes that was described above, then only writes that are local to modules that a processor is coherent with need to be tracked and flushed on a release operation.

Selective Coherence

Another extension to the scheme described above is to only maintain coherence for subsets of the remote physical address space. This scheme can be achieved by a number of techniques.

According to a first exemplary technique, a subset of each PIM's memory (e.g., the upper half of each memory module's local memory space) is kept coherent across the system. To achieve this, the R bit is only set for data corresponding to the coherent subset of remote memory addresses. The V bit is set for all other valid cache lines, including those corresponding to remote memory modules that are outside the coherent subset of the remote module's memory. In such a system, system and/or application software places any data structures that are to be kept coherent in the coherent regions of the address space. Data structures that do not need coherence (e.g., read-only data structures) may be placed in non-coherent regions to allow them to persist in remote caches across acquire operations. If caching of remote write data is allowed, only the lines from the coherent remote addresses need to be tracked and flushed on a release operation.

According to another exemplary technique, a bit is added to each page table entry in the processor's virtual memory management scheme to indicate whether that page is kept coherent or not. This bit is set by system software for pages that will be kept coherent. When remote lines are inserted into caches, the R bit is only set if the address corresponds to a page for which cache coherence is to be maintained. The V bit is set for all other valid cache lines, including those corresponding to remote modules but belong to pages that are not annotated in the page table entry as requiring cache coherence. This allows data in non-coherent pages to persist in caches across acquire operations. If caching of remote write data is allowed, only the lines from the coherent remote addresses need to be tracked and flushed on a release operation.

With the selective coherence extension, when the R bits are cleared on an acquire operation, non-coherent remote data is not invalidated. Similarly, if the above-described optimization for caching remote writes is incorporated, only the cache lines that are both remote and belong to coherent addresses are placed in the write-tracking hardware data structure and need to be flushed before the release operation can complete.

Especially in the page-based scheme described above, the annotation of which pages require coherence support is under software control. Therefore, this set of mechanisms can be used to implement a variety of software-driven polices to reduce the overhead of coherence operations.

The processor and cache policy of FIGS. 5 and 6 may be implemented with various combinations of hardware and software. For example the caching policy of FIG. 6 may be implemented with hardware circuitry for speed and efficiency purposes. This hardware circuitry may include priority encoders, finite state machines, programmable logic arrays (PLAs), and the like. In some embodiments, other functions can be performed by a data processor or execution core under the control of software. Some of the software components may be stored in a computer readable storage medium for execution by at least one processor, and may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Data processor 240 of FIGS. 2 and 5 or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist includes a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, each remote processor can implement any combination of the frequent remote writes, cache bit structure, or cache coherence domains, or selective coherence modifications described above. Moreover while the embodiments have been described in the context of a processor-in-memory used in a stacked die module, in other embodiments the processor and local memory can be associated in other ways without being physically integrated into a common module. The types of operations performed by the local processor can also vary between embodiments. Also FIG. 2 illustrates an example in which each PIM is associated with four memory chips in a memory chip stack, but in other examples the number of memory chips in the stack can vary.

Accordingly, it is intended by the appended claims to cover all modifications of the disclosed embodiments that fall within the scope of the disclosed embodiments.

What is claimed is:

1. A data processing system, comprising:
   a plurality of processors each comprising a local cache;
   a plurality of local memories each associated with and coupled to a corresponding one of said plurality of processors; and
   at least one inter-processor link between a corresponding pair of said plurality of processors,
   wherein in response to a first processor performing a store operation on an address of a corresponding local memory that is currently not in said local cache, said local cache allocates a first cache line and encodes a local state with said first cache line, in response to said first processor performing a load operation from an address of a remote memory that is currently not in said local cache, said local cache allocates a second cache line and encodes a remote state with said second cache line, and in response to said first processor performing a store operation to an address of said remote memory that is currently not in said local cache, said local cache performs a write-through of data of said store operation to said remote memory without allocating a cache line in said local cache, and
   wherein said first processor performs subsequent loads and stores on said first cache line in said local cache in response to said local state, and performs subsequent loads from said second cache line in said local cache in response to said remote state.

2. The data processing system of claim 1, wherein in response to said first processor performing a store access to said second cache line, said local cache updates its copy of said second cache line and also performs a write-through operation of said store access to said remote memory.

3. The data processing system of claim 1, wherein in response to an acquire operation from said first processor, said local cache invalidates cache lines that are in said remote state.

4. The data processing system of claim 1, wherein in response to said first processor performing a write operation to an address of said remote memory that is currently not in said local cache, said local cache allocates a third cache line to store data associated with said write operation and tracks a location of said third cache line within said local cache in a hardware data structure.

5. The data processing system of claim 4, wherein said local cache flushes contents of cache lines in said local cache corresponding to tracked addresses in said hardware data structure in response to one of an acquire operation and a release operation.

6. The data processing system of claim 1, wherein each of said plurality of processors comprises a processor-in-memory, and said local memory comprises a plurality of vertically stacked high bandwidth memory chips.

7. The data processing system of claim 1, wherein said local cache maintains a cache state of each cache line using a plurality of bits, wherein said plurality of bits comprises a valid bit and a remote bit, wherein said local cache encodes said local state when said valid bit is true and said remote bit is false, and encodes said remote state when said valid bit is false and said remote bit is true.

8. The data processing system of claim 7, wherein in response to an acquire operation from said first processor, said local cache clears all remote bits while leaving any other bits of said plurality of bits unchanged.

9. The data processing system of claim 1, wherein:
   each of said plurality of processors is combined with one or more corresponding local memories in a respective memory module; and
   the data processing system further comprises a host processor coupled to each of said plurality of processors.

10. The data processing system of claim 1, wherein in response to said load operation to said remote memory, said local cache indicates said second cache line is in said remote state only if said load operation is to a coherent portion of an address space of said remote memory.

11. The data processing system of claim 1, wherein in response to said first processor performing a load operation on an address of said corresponding local memory that is currently not in said local cache, said local cache allocates a third cache line and encodes a local state with said third cache line.

12. A memory module, comprising:
a local processor comprising a local cache and having an inter-processor link; and
a local memory comprising a plurality of memory chips attached to said local processor,
wherein in response to said local processor performing a store operation on an address of said local memory that is currently not in said local cache, said local cache allocates a first cache line and encodes a local state with said first cache line, in response to said local processor performing a load operation from an uncached address of a remote memory that is currently not in said local cache, said local cache allocates a second cache line and encodes a remote state with said second cache line, and in response to said local processor performing a store operation to an address of said remote memory that is currently not in said local cache, said local cache performs a write-through of data of said store operation to said remote memory without allocating a cache line in said local cache, and
wherein said local processor performs subsequent loads and stores to said first cache line in said local cache in response to said local state, and performs subsequent loads from said second cache line in said local cache in response to said remote state.

13. The memory module of claim 12, wherein in response to said local processor performing a store operation to said second cache line, said local cache updates its cache copy of said second cache line, and also performs a write-through operation of said store operation to said remote memory.

14. The memory module of claim 12, wherein in response to an acquire operation from said local processor, said local cache invalidates cache lines that are in said remote state.

15. The memory module of claim 12, wherein in response to said local processor performing a write operation an address of said remote memory that is currently not in said local cache to said second cache line, said local cache allocates a third cache line to store data associated with said write operation and tracks a location of said third cache line within said local cache in a hardware data structure.

16. The memory module of claim 15, wherein said local cache flushes contents of cache lines in said local cache corresponding to tracked addresses in said hardware data structure in response to one of an acquire operation and a release operation.

17. The memory module of claim 12, wherein said local processor comprises a processor-in-memory, and said local memory comprises a plurality of vertically stacked high bandwidth memory chips.

18. The memory module of claim 12, wherein said local cache maintains a cache state of each cache line using a plurality of bits, wherein said plurality of bits comprises a valid bit and a remote bit, wherein said local cache encodes said local state when said valid bit is true and said remote bit is false, and encodes said remote state when said valid bit is false and said remote bit is true.

19. The memory module of claim 18, wherein in response to an acquire operation from said local processor, said local cache clears all remote bits while leaving any other bits of said plurality of bits unchanged.

20. The memory module of claim 12, wherein in response to said local processor performing a load operation on an address of said local memory that is currently not in said local cache, said local cache allocates a third cache line and encodes a local state with said third cache line.

21. A method, comprising:
generating a memory operation by a processor associated with a local memory;
in response to a store operation to said local memory, allocating a first cache line to a local cache and placing said first cache line in a valid state while keeping a remote state clear;
in response to a load operation to a remote memory, allocating a second cache line to said local cache and placing said second cache line in said remote state while keeping said valid state clear;
in response to a store operation by said processor to an address of said remote memory that is not currently in said local cache, performing a write-through of data of said store operation to said remote memory without allocating a cache line in said local cache; and
performing a subsequent access to one of said first cache line and said second cache line in said local cache in response to one of said valid state and said remote state being set.

22. The method of claim 21, further comprising:
in response to a store operation by said processor to said second cache line, updating said second cache line in said local cache and performing a write-through operation of said store operation to said remote memory.

23. The method of claim 21, further comprising:
invalidating cache lines in said local cache that are in said remote state in response to an acquire operation from said processor.

24. The method of claim 21, wherein in response to performing a write operation to an address of said remote memory that is currently not in said local cache, the method further comprises:
allocating a third cache line in said local cache to store data associated with said write operation; and
tracking a location of said third cache line within said local cache in a hardware data structure.

25. The method of claim 24, further comprising:
flushing contents of cache lines in said local cache corresponding to tracked addresses in said hardware data structure in response to one of an acquire operation and a release operation.

26. The method of claim 21, further comprising:
maintaining a cache state of each cache line in said local cache using a plurality of bits, wherein said plurality of bits comprises a valid bit and a remote bit;
encoding a local state when said valid bit is true and said remote bit is false; and
encoding said remote state when said valid bit is false and said remote bit is true.

27. The method of claim 26, further comprising:
clearing all remote bits in said local cache while leaving any other bits of said plurality of bits unchanged in response to an acquire operation from said processor.

28. The method of claim 21, further comprising:
indicating said second cache line is in said remote state only in response to said load operation to said remote memory if said load operation is to a coherent portion of an address space of said remote memory.

29. The method of claim 21, further comprising:
in response to a load operation to said local memory that is currently not in said local cache, allocating a third cache line to said local cache and placing said third cache line in a valid state while keeping said remote state clear.

* * * * *